United States Patent
Bos et al.

(10) Patent No.: US 6,695,478 B2
(45) Date of Patent: Feb. 24, 2004

(54) SQUEEZE FILM DAMPING TYPE BEARING

(75) Inventors: Mathieu Bos, Zonhoven (BE); Sébastien Ryhon, Sprimont (BE)

(73) Assignee: Techspace Aero S.A. (BE)

( * ) Notice: Subject to any disclaimer, the term of this patent is extended or adjusted under 35 U.S.C. 154(b) by 0 days.

(21) Appl. No.: 09/896,713

(22) Filed: Jun. 29, 2001

(65) Prior Publication Data

US 2002/0076124 A1 Jun. 20, 2002

(30) Foreign Application Priority Data

Jun. 30, 2000 (EP) .............................. 00870148

(51) Int. Cl.[7] .............................................. F16C 27/00
(52) U.S. Cl. ........................................................ 384/99
(58) Field of Search ........................ 384/99, 479, 487, 384/481, 515, 513

(56) References Cited

U.S. PATENT DOCUMENTS

| | | | |
|---|---|---|---|
| 3,652,139 A | * | 3/1972 | Memery |
| 3,756,672 A | * | 9/1973 | Hibner et al. |
| 4,175,803 A | | 11/1979 | Roberts |
| 4,337,983 A | * | 7/1982 | Hibner |
| 4,400,098 A | * | 8/1983 | Lacey et al. |
| 4,440,456 A | * | 4/1984 | Klusman |
| 5,058,452 A | | 10/1991 | El-Shafei |
| 5,251,985 A | | 10/1993 | Monzel |

FOREIGN PATENT DOCUMENTS

| | | | |
|---|---|---|---|
| FR | 2517772 | | 6/1983 |
| JP | 09 112549 | * | 5/1997 |

* cited by examiner

Primary Examiner—Lenard A. Footland
(74) Attorney, Agent, or Firm—Knobbe, Martens, Olson & Bear, LLP

(57) ABSTRACT

The present invention relates to a bearing for maintaining an inner mobile structural component with revolution symmetry, rotating inside an outer structural component, which is itself fixed or mobile, said bearing comprising a set of balls and at least one joining member which provides the mechanical contact between said balls and said outer structural component, said bearing also comprising a pressurized-oil damper known as a "squeeze film" damper, arranged at the annular contact surface between said joining member and the outer structural component, said bearing comprising at least two annular elastic seals, each arranged in a groove, at the edges of said annular contact surface, wherein the annular elastic seals are U-shaped lip seals, the hollow space of which is directed towards the "squeeze film", or are E-type seals, the hollow spaces of which are directed towards the "squeeze film", the leakproofing for each seal being ensured by the contact between said seal and the two parallel side surfaces of said groove, referred to as sealing side contact surfaces, so that the seal exerts axial pressure forces on said parallel side surfaces during the rotation of the bearing.

16 Claims, 3 Drawing Sheets

SQUEEZE FILM DAMPING TYPE BEARING

CROSS-REFERENCE TO RELATED APPLICATION

This application claims priority to European Application Serial Number 00 870 148.4, filed Jun. 30, 2000, the disclosure of which is incorporated herein by reference in its entirety.

BACKGROUND

1. Field of the Invention

The present invention relates to a damping device of "squeeze film" type which acts as a pressurized-oil damper, integrated in a rolling bearing, which is intended in particular to be used in civil aeronautics.

Specifically, the invention relates to the rolling bearing using the damping device.

2. Description of Related Art

A rolling bearing such as, for example, in an aircraft engine, serves as a link between one or more inner mobile members, preferably having a revolution symmetry and rotating about an axis, and an outer structure. The outer structure may itself be either fixed or mobile. This structure also has a revolution symmetry relative to the rotational axis of the mobile member(s). It may be, for example, in the shape of a cone.

The rolling bearing consists substantially of balls or rollers which move on tracks that are securely fastened or made with races, preferably an inner race and an outer race.

When working, forces are transmitted from the mobile member to the outer structure, in particular via the outer rolling race, which is directly in contact with the outer structure.

In order to damp the effect of these forces, it is known to confine a film of oil between the outer rolling race, which works by friction, and the outer structural component. This film of oil is commonly known as a "squeeze film".

The oil present at the race/outer structure contact surface is oil under pressure, which acts as a damper.

Most of the known "squeeze films" annulus are made leakproof by means of seals in the form of segments of "piston" type. These seals are placed in two annular grooves machined in the race at its surface of contact with the outer structure. The film of oil is consequently more particularly confined in the space delimited by these two annular grooves.

The main problem lies in sealing such a device.

Document U.S. Pat. No. 4,175,803, in particular, describes the "squeeze film" technique constituting a pressurized-oil damper, used particularly in engines of gas turbine type.

In these engines, two rolling bearings are used to maintain in a fixed structure, at its ends, the shaft bearing the vanes of the compressor and of the low-pressure turbine.

Similarly, two other rolling bearings are used to maintain in rotation, about the abovementioned shaft, the shaft bearing the vanes of the compressor and the vanes of the high-pressure turbine. One of the bearings bears on the abovementioned shaft, and the other bears on the fixed structure.

These four rolling bearings are examples of the field of application of the present invention.

The bearings are subjected to vibrations brought about by certain imbalances. During these vibrations, the hydraulic damping film (known as the "squeeze film") is "crushed" at a point of the annular space which exists between the outer race and the outer structure surrounding this race.

The vibrations drive this "crush point" in an orbital (precessional) motion along the annular space.

The presence of oil maintained under pressure in the annular space, by means of the orbital motion, has the effect of creating a damping of the vibration.

In order to produce a sufficient and stable damping, it is desirable to maintain the "squeeze film" annulus by means of a sealing device.

Most of the "squeeze films" proposed comprise seals of the same type as the piston segments of motor vehicle engines and they act at least partially by a radial pressure, such as, for example, in document FR-A-2 517 772.

This type of seal has various drawbacks. Dynamic seals of piston-segment type must be machined with great precision. They are thus expensive. Furthermore, they are intricate to mount. Finally, they have an uncalibrated oil leakage and thus their damping is not always fully controlled.

Document U.S. Pat. No. 4,440,456 describes a damping device of squeeze-film type for a rolling bearing.

In order to ensure sealing between the squeeze film and the rolling bearing, said bearing is provided with two seals of "O-ring" type (of circular cross section) each arranged in a groove.

The sealing is ensured by crushing said seal between the base of said groove and the side surface.

Documents U.S. Pat. No. 3,652,139, U.S. Pat. No. 3,756,672, U.S. Pat. No. 4,337,983 and U.S. Pat. No. 5,058,452 all describe damping devices of squeeze-film type in which seals of substantially circular shape (O-ring) arranged in grooves are provided, which ensure the sealing.

SUMMARY OF THE INVENTION

In each case, the sealing is ensured by crushing said seal between the base of said groove and the contact surface of the associated component. These are seals of elastomeric type which consequently have a limited lifetime, in particular in the case of applications used according to the present invention, that is to say as oil dampers for aircraft engines.

AIMS OF THE INVENTION

The present invention aims to provide a solution for the sealing of "squeeze films" dampers which does not have the drawbacks of the prior art.

The present invention aims more particularly to produce excellent sealing while at the same time having good reproducibility. The reason for this is that the oil leakage may thus be calibrated.

The present invention aims also to make possible the use of seals of moderate cost, in particular of seals which are almost standard seals and are substantially commercially available.

In particular, the present invention aims to provide an advantageous solution for rolling bearings, with or without a thrust bearing, used in civil aeronautic engines.

MAIN CHARACTERISTIC ELEMENTS OF THE INVENTION

The present invention relates to a bearing for maintaining an inner mobile structural component with revolution symmetry, rotating inside an outer structural component, which is itself fixed or mobile, said bearing comprising a set of balls and at least one joining member which provides the mechanical contact between said balls and said outer structural component, said bearing also comprising a pressurized-oil damper known as a "squeeze film" damper, arranged at the annular contact surface between said joining member and the outer structural component, said bearing comprising at least two annular elastic seals, each arranged in a groove, at the edges of said annular contact surface, wherein the annular elastic seals are U-shaped lip seals, the hollow space of which is directed towards the "squeeze film", or E-type seals, the hollow spaces of which are directed towards the "squeeze film". The leakproofing for each seal is ensured by the contact between said seal and the two parallel side surfaces of said groove, referred to as sealing side contact surfaces, such that the seal exerts axial pressure forces on said parallel side surfaces during the rotation of the bearing.

This mean ensures the leakproofing of the "squeeze film" damper at the seal, substantially along its contact surface.

Advantageously, the annular elastic seals are U-shaped lip seals or E-type seals, the hollow space(s) of which is (are) directed towards the "squeeze film", so that the oil pressure gives rise to an axial pressure on the wings of the seals, which acts to promote the sealing.

Preferably, the U-shaped lip seals are polymeric seals, for example polyimide seals, comprising a spring member inside the "U".

Preferably, the E-type seals are metallic seals.

Furthermore, according to the configuration used, the outside diameter of one of the two annular seals is not more than the inside diameter of the other annular seal.

According to one preferred embodiment, the two grooves are arranged asymmetrically on either side of said annular contact surface, one of the sealing side contact surfaces with said seal belonging to the outer structural component and the other sealing side contact surface with said seal belonging to said joining member.

According to one particularly advantageous embodiment of the present invention, the joining member has a first annular flange and the outer structural component has a second annular flange, the placing in contact of the outer structural component and the joining member cooperatively ensuring the formation of the groove in which the annular seal is arranged and compressed.

According to another embodiment of the present invention, said joining member consists of an outer rolling race.

According to another embodiment of the invention, said joining member consists of an outer rolling race and an intermediate race, said first annular flanges intended to form the grooves being located on said intermediate race.

The invention also relates to a joining member of a bearing for maintaining an inner mobile structural component with revolution symmetry, rotating inside an outer structural component, which is itself fixed or mobile, said bearing comprising a set of balls, said joining member ensuring the mechanical contact between said balls and said outer structural component, said bearing further comprising a pressurized-oil damper known as a "squeeze film" damper, arranged at the annular contact surface between said joining member and the outer structural component; said joining member comprising at least two first annular flanges which cooperate with two second annular flanges machined in the structural component, during the placing in contact of said outer structural component and said joining member, to form at least two grooves, arranged at the edges of the annular contact surface between the joining member and the outer structural component, asymmetrically on either side of said annular contact surface, each groove resulting from placing a first flange opposite a second flange, at least two annular elastic seals being arranged in said grooves, the annular elastic seals being U-shaped lip seals, the hollow space of which is directed towards the "squeeze film", or E-type seals, the hollow spaces of which are directed towards the "squeeze film". The leakproofing for each seal is ensured by the contact between said seal and the two parallel side surfaces of said groove, so that the seal exerts axial pressure forces on said parallel side surfaces during the rotation of the bearing.

According to a first preferred embodiment, the joining member consists of an outer rolling race.

According to a second preferred embodiment, the joining member consists of an outer rolling race and an intermediate race, said first flanges intended to form the grooves being located on said intermediate race.

DESCRIPTION OF AN EMBODIMENT ACCORDING TO THE PRIOR ART

Figure 1:
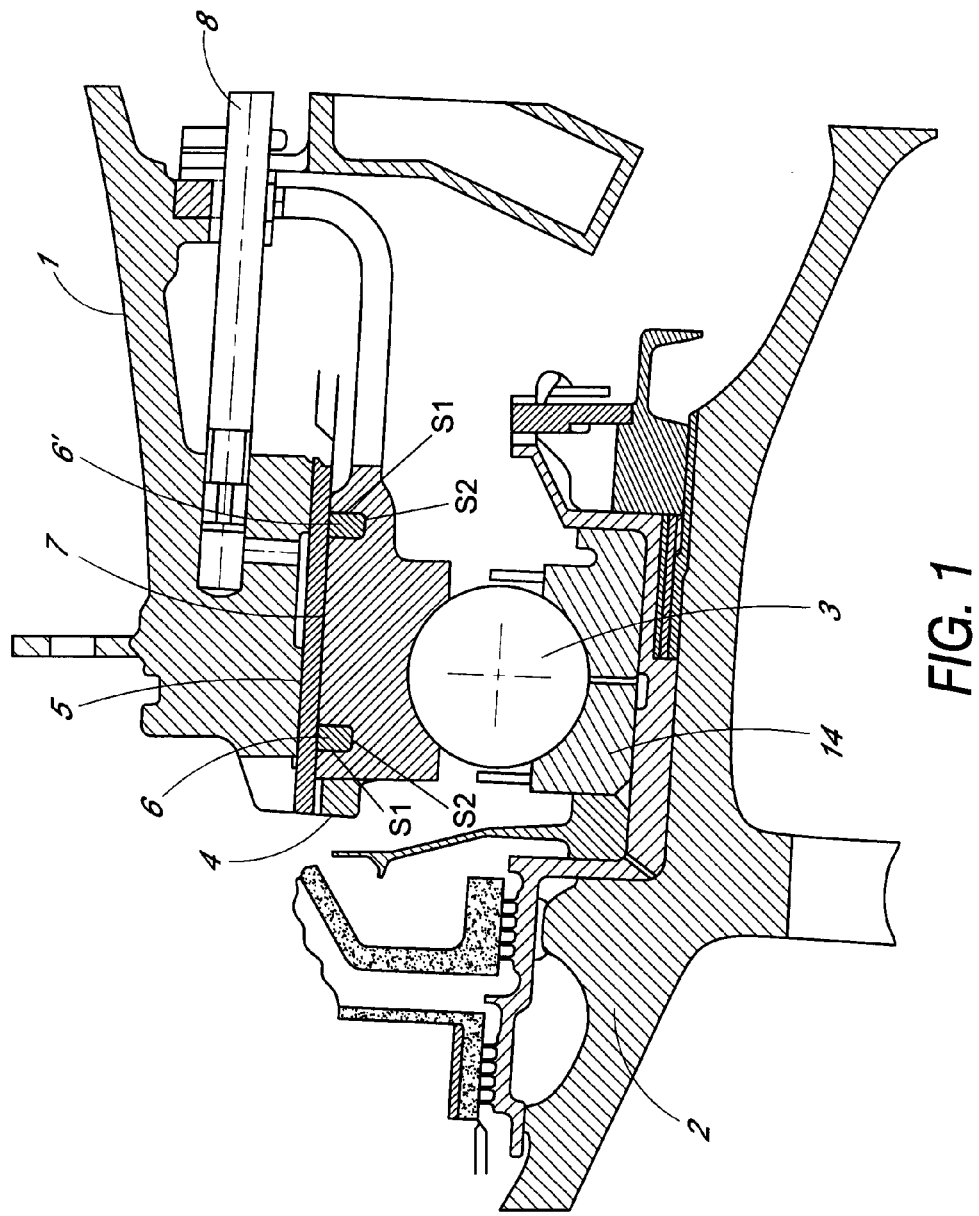
FIG. 1 represents a cross-section view, along a plane passing through the revolution axis, of a rolling bearing provided with a "squeeze film" damper according to the prior art.

FIG. 1 gives an example of a rolling bearing using a "squeeze film" damper according to the prior art, in the particular case of an aeronautic engine. The bearing ensures the connection between a fixed conical structural component 1 arranged around a rotating mobile member 2, for example an engine shaft in this case, by means of one or more ball bearings 3. The bearing has revolution symmetry about the axis of the engine shaft. The rolling thus consists of a set of balls 3 arranged in a circle between the two outer 4 and inner 14 races. The balls 3 are placed in contact with the fixed structural component 1 via the outer race 4, the contact surface 5 between the outer race 4 and the structural component 1 being annular. Two grooves 6 and 6' are machined on this race 4 at the ends of the annular contact surface 5. A circular seal with substantially rectangular cross section, of piston segment type, is placed in each groove. The pressurized oil constituting the "squeeze film" is injected into this contact surface 5, between the two grooves 6 and 6' in an orifice 7 via a channel 8. The oil pressure which is exerted on the seal ensures the sealing by increasing the contact surface between the seal and two perpendicular surfaces S1 and S2 of the grooves, the pressure forces being both radial and axial.

The seals according to the prior art must be made to measure for each particular application. They require very precise mechanical adjustment and mounting.

Figure 2:
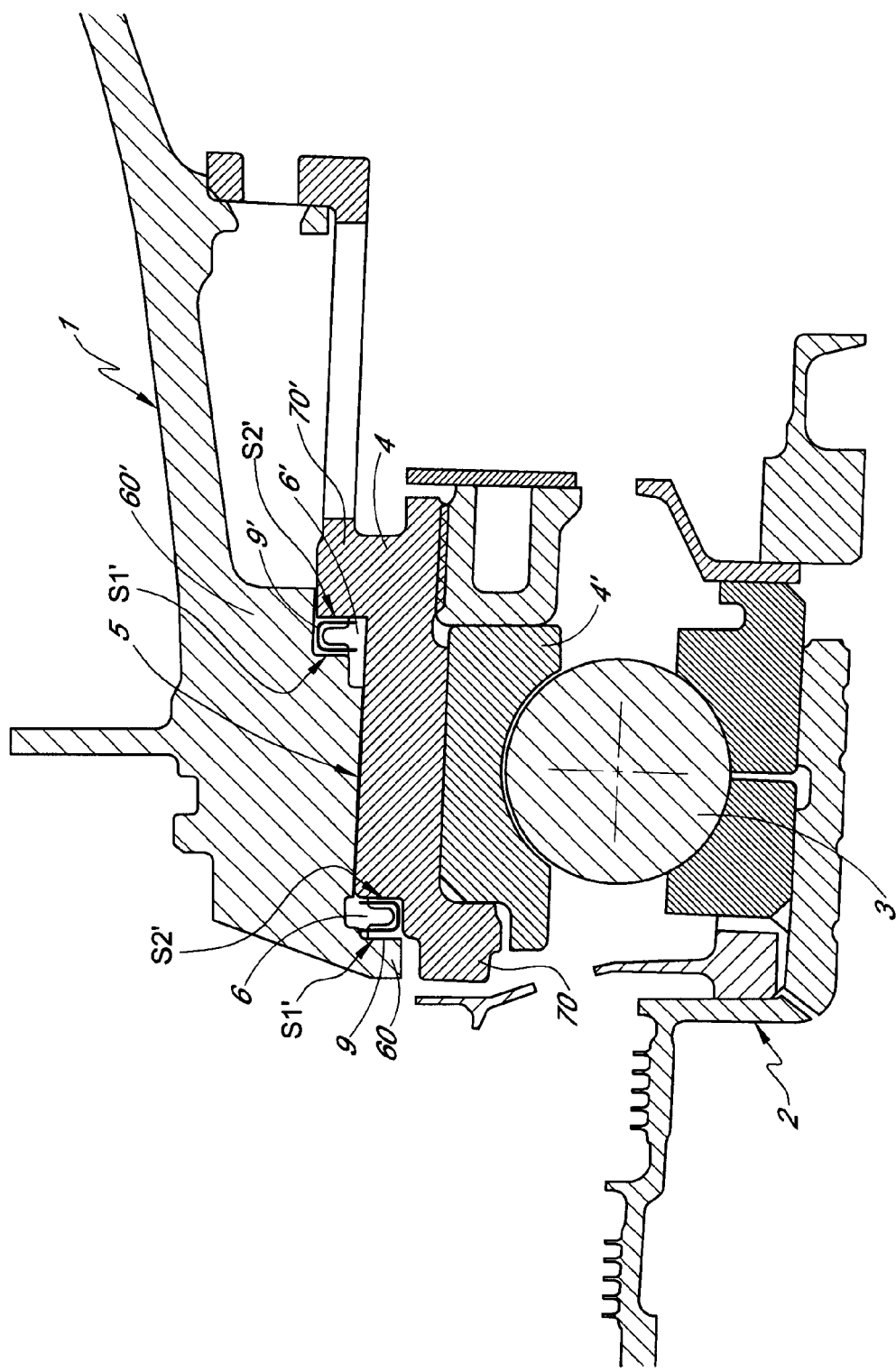
FIG. 2 represents a cross-section view, along a plane passing through the revolution axis, of a rolling bearing provided with a "squeeze film" damper according to one preferred embodiment of the present invention.

According to one embodiment of the invention represented in FIG. 2, two grooves are made on either side of the contact surface 5 between the rolling race 4 which constitutes a joining member and the outer structural component 1, and thus on either side of the film of oil. These grooves are asymmetrical relative to the annular contact surface 5 occupied by the film of oil. In contrast with the abovementioned description, these two grooves are obtained from machining two flanges 60, 60' in the outer structural component 1 and two flanges 70, 70' in the rolling race 4, rather than only in the rolling race 4, and are thus formed by cooperative contact of the outer structural component 1 and the rolling race or joining member 4.

Figure 3:
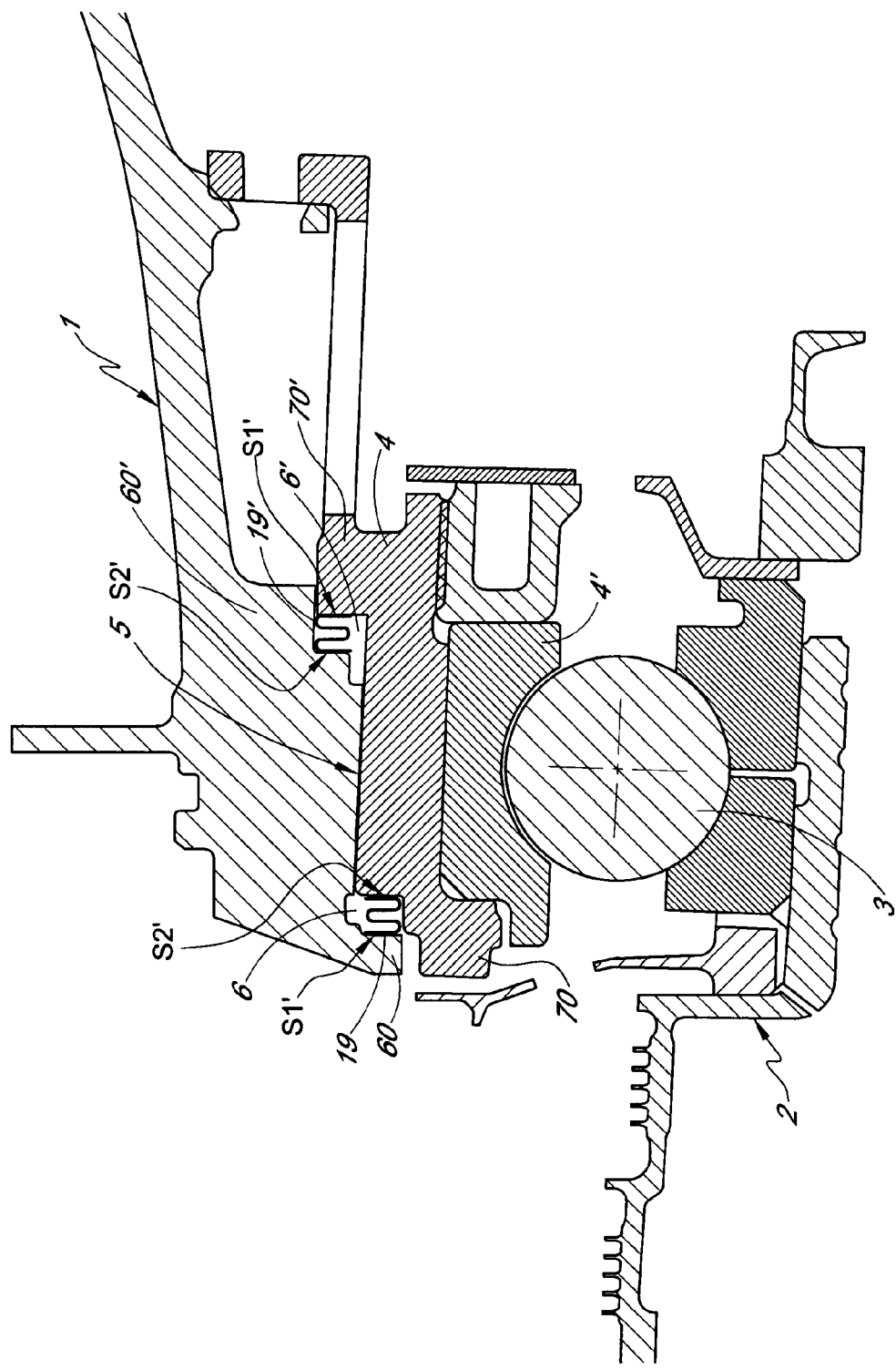
FIG. 3 represents a cross-section view, along a plane passing through the revolution axis, of a rolling bearing provided with a "squeeze film" damper according to one variant of this preferred embodiment of the present invention.

Each groove contains either a U-shaped lip seal 9, 9' (FIG. 2), or an E-shaped metallic seal 19, 19' (FIG. 3). These seals work by friction, the outer rolling race 4 being able to move slightly relative to the fixed outer structural component 1 by rubbing on the seal. The friction is generated by a radial or precessional relative movement of the outer race or joining member 4, which is floating relative to the fixed outer structural component 1.

The lip seal 9, 9' is an elastomeric seal, for example a polyimide seal, provided with a metal spring, located inside, which keeps the lips apart.

The E-type metallic seal 19, 19' is advantageously resistant to high temperatures.

The lips of the seals 9, 9', 19, 19' are directed towards the annular contact surface 5. The oil pressure causes the seal to spread and ensure the sealing by increasing the contact surface between the seal and the parallel surfaces S1' and S2', the pressure forces being axial.

Given the complexity of machining the device according to the invention, it may be desirable, according to one particularly preferred embodiment of the invention, to use a joining member comprising, in addition to the outer rolling race 4, an intermediate race 4' so as to ensure indirect mechanical contact between the actual outer race 4 and the outer structural component 1 (FIG. 3). It is thus possible not to modify the original rolling bearing, which remains standard. In FIGS. 2 and 3, it may be alternatively considered that the outer track is either the outer rolling race 4 itself or the intermediate race 4'.

The device according to the invention is very easy to assemble. The assembly is advantageously carried out without specific tools, by simply placing the rolling bearing in the structure designed to receive it.

The assembly is carried out as follows:

each annular elastic seal 9, 9' (or 19, 19') is placed on the outer structural component 1, in the two flanges machined therein;

the ball bearing 3, provided with its joining member 4, is then fitted in the outer structural component 1, each annular seal 9, 9' (or 19, 19') resting on the corresponding groove 6, 6' formed by placing the joining member 4 in contact with the outer structural component 1;

each annular seal 9, 9' (or 19, 19') is compressed by gripping means pressed onto said outer structural component 1 and onto the joining member 4.

What is claimed is:

1. A bearing for maintaining an inner mobile structural component with revolution symmetry rotating inside an outer structural component, which is itself fixed or mobile, said bearing comprising:
   a set of rolling elements wherein said rolling elements are selected from the group consisting of balls and rollers;
   at least one joining member which provides a mechanical contact between said rolling elements and an outer structural component along an annular contact surface;
   a pressurized-oil damper arranged at said annular contact surface between said at least one joining member and said outer structural component; and
   at least two annular elastic seals, each arranged in a groove at the edges of said annular contact surface and contacting two parallel side surfaces of said groove such that axial pressure forces are exerted by the seal on said parallel side surfaces during rotation of said bearing, wherein said at least two annular elastic seals are U-shaped lip seals, each arranged such that a hollow space within each of said U-shaped lip seals is directed towards said pressurized-oil damper.

2. The bearing according to claim 1, wherein said U-shaped lip seals are polymeric seals.

3. The bearing according to claim 2, wherein said polymeric seals are polyimide seals.

4. The bearing according to claim 2, wherein said polymeric seals include a spring member inside the "U" of the U-shaped lip seals.

5. The bearing according to claim 1, wherein said two parallel side surfaces are two sealing side contact surfaces.

6. The bearing according to claim 5, wherein the grooves are arranged asymmetrically on either side of said annular contact surface such that one of said sealing side contact surfaces belongs to the outer structural component and the other sealing side contact surface belongs to said at least one joining member.

7. The bearing according to claim 1, wherein the at least one joining member includes a first annular flange and the outer structural component includes a second annular flange, such that placing the outer structural component in contact with the at least one joining member cooperatively ensures the formation of said grooves in which the at least two annular elastic seals are arranged and compressed.

8. The bearing according to claim 1, wherein said pressurized-oil damper is a squeeze film damper.

9. A joining member for a bearing to maintain an inner mobile structural component with revolution symmetry in rotation inside an outer structural component, which is itself fixed or mobile, where said bearing includes a set of rolling elements selected from the group consisting of rollers and balls and a pressurized-oil damper arranged at an annular contact surface between said joining member and said outer structural component where said joining member provides mechanical contact between said rolling elements and said outer structural component, said joining member comprising:
   at least two first annular flanges configured to cooperate with two second annular flanges of said outer structural component when placing said outer structural component in contact with said joining member;
   at least two grooves, each formed by placing one of the at least two first annular flanges opposite one of the second annular flanges and arranged at the edges of said annular contact surface; and
   at least two annular elastic seals, each arranged in said at least two grooves and contacting two parallel side surfaces of said groove such that axial pressure forces are exerted by the seal on said parallel side surfaces during rotation of said bearing, wherein said at least two annular elastic seals are U-shaped lip seals, each arranged such that a hollow space within each of said U-shaped lip seals is directed towards said pressurized-oil damper.

10. The joining member according to claim 9, wherein said U-shaped lip seals are polymeric seals.

11. The joining member according to claim 10, wherein said polymeric seals are polyimide seals.

12. The joining member according to claim 10, wherein said polymeric seals include a spring member inside the "U" of the U-shaped lip seals.

13. The joining member according to claim 9, further comprising an outer rolling race, a bearing, and an intermediate component, wherein said at least two first annular flanges are located on said intermediate component.

14. The joining member according to claim 9, wherein said two parallel side surfaces are two sealing side contact surfaces.

15. The joining member according to claim 14, wherein the grooves are arranged asymmetrically on either side of said annular contact surface such that one of the sealing side contact surfaces belongs to the outer structural component and the other sealing side contact surface belongs to said joining member.

16. The joining member according to claim 9, wherein said pressurized-oil damper is a squeeze film damper.

* * * * *